United States Patent
Suzuki et al.

(10) Patent No.: US 6,647,795 B2
(45) Date of Patent: Nov. 18, 2003

(54) CAPACITIVE PHYSICAL LOAD SENSOR AND DETECTION SYSTEM

(75) Inventors: Yasutoshi Suzuki, Okazaki (JP); Seiichiro Ishio, Kariya (JP); Keiichi Shimaoka, Aichi-gun (JP); Norikazu Ohta, Aichi-gun (JP); Hirofumi Funabashi, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/157,229

(22) Filed: May 30, 2002

(65) Prior Publication Data

US 2002/0178828 A1 Dec. 5, 2002

(30) Foreign Application Priority Data

Jun. 1, 2001 (JP) ........................ 2001-166350

(51) Int. Cl.[7] ................................ G01L 9/00
(52) U.S. Cl. ........................................ 73/718
(58) Field of Search ............... 73/780, 862.337, 73/862.68, 718

(56) References Cited

U.S. PATENT DOCUMENTS

| | | | | |
|---|---|---|---|---|
| 4,204,244 A | * | 5/1980 | Ho ........................ | 361/283.4 |
| 4,380,041 A | * | 4/1983 | Ho ........................ | 361/283.4 |
| 4,838,088 A | | 6/1989 | Murakami | |
| 4,852,443 A | * | 8/1989 | Duncan et al. ............ | 84/733 |
| 4,933,807 A | * | 6/1990 | Duncan .................. | 361/283.2 |
| 5,321,989 A | | 6/1994 | Zimmer et al. | |
| 6,148,674 A | * | 11/2000 | Park et al. ............... | 73/724 |

* cited by examiner

*Primary Examiner*—Max Noori
(74) *Attorney, Agent, or Firm*—Posz & Bethards, PLC

(57) ABSTRACT

A capacitive physical load sensor includes a substrate, which has fixed electrodes, and a diaphragm, which has movable electrodes. The diaphragm is located across a gap from the substrate, and retaining parts for the diaphragm are formed around the diaphragm. Protruding parts extend into the gap from the diaphragm or from the substrate. The protruding parts support the diaphragm at different levels of deformation to alter the characteristics of the diaphragm and extend its range.

7 Claims, 8 Drawing Sheets

CAPACITIVE PHYSICAL LOAD SENSOR AND DETECTION SYSTEM

CROSS REFERENCE TO RELATED APPLICATION

This application relates to and incorporates by reference Japanese patent application no. 2001-166350, which was filed on Jun. 1, 2001.

BACKGROUND OF THE INVENTION

This invention relates to a capacitive physical load sensor and a capacitive physical load detection system.

An example of a capacitive physical load detection system having a conventional capacitive physical load sensor will first be described by referring to FIG. 14 through FIG. 18. As shown in FIG. 14, the conventional capacitive pressure detection system 1 includes a capacitive pressure sensor 10 and capacitive detection circuits 64. The capacitive pressure sensor 10 includes a pressure sensitive capacitor 20 with pressure capacitance $C_X$ and a reference capacitor 30 with reference capacitance $C_R$. The pressure sensitive capacitor 20 is connected to input 60 of a detection voltage $V_X$. Reference capacitor 30 is connected to input 62 of a reference voltage $V_R$. Pressure sensitive capacitor 20 and reference capacitor 30 are connected to the capacitance detection circuits 64. The capacitance detection circuits 64 are connected to an output 78 of a voltage $V_{OUT}$.

The capacitive pressure sensor 10 is manufactured by forming a diaphragm on a silicon substrate. More specifically, the capacitive pressure sensor 10 includes a silicon substrate 80, a diaphragm 84, which is formed across a gap 82 from the silicon substrate 80, and a retaining part 86 for the diaphragm 84, which is formed around the diaphragm 84, as shown in FIGS. 16 to 18.

Formed on a top surface of the silicon substrate 80 is a pressure sensitive capacitor lower electrode 22b and reference capacitor lower electrode 32b. The pressure sensitive capacitor lower electrode 22b is connected to a pressure sensitive capacitor lower electrode pad 26b through a pressure sensitive capacitor lower electrode lead 24b (see FIG. 15 and FIG. 16), and the reference capacitor lower electrode 32b is connected to a reference capacitor lower electrode pad 36b through a reference capacitor lower electrode lead 34b (see FIG. 15 and FIG. 16). The surface of the silicon substrate 80 is covered by a substrate protective layer 88 (see FIG. 16 through FIG. 18).

The diaphragm 84 includes a semiconductor film 92, which consists of a poly silicon film, and a protective film 96, which consists of a silicon nitride film. A pressure sensitive capacitor upper electrode 22a and a reference capacitor upper electrode 32a are formed on top of the semiconductor film 92. The pressure sensitive capacitor upper electrode 22a is connected to a pressure sensitive capacitor upper electrode pad 26a through a pressure sensitive capacitor upper electrode lead 24a (see FIG. 15 and FIG. 17), and the reference capacitor upper electrode 32a is connected to a reference capacitor upper electrode pad 36a through a reference capacitor upper electrode lead 34a (see FIG. 15 and FIG. 17).

A pressure capacitor 20 shown in FIG. 14 includes the pressure sensitive capacitor upper electrode 22a and the pressure sensitive capacitor lower electrode 22b shown in FIG. 16 through FIG. 18. The reference capacitor 30 shown in FIG. 13 includes the reference capacitor upper electrode 32a and reference capacitor lower electrode 32b shown in FIGS. 16 to 18.

When pressure is applied to the diaphragm 84, the gap 82 acts as a pressure reference chamber that is sealed in a vacuum, and the diaphragm 84 stretches and changes shape in proportion to the applied pressure, as shown in FIGS. 16 to 18. When the shape of the diaphragm 84 changes, the distance between the upper electrode 22a and the lower electrode 22b changes. When the distance between the two electrodes changes, the capacitance between the two electrodes also changes. The circuits shown in FIG. 14 detect a difference between a change in the pressure sensitive capacitance $C_X$ of the pressure sensitive capacitor 20 and the reference capacitance $C_R$ of the reference capacitor 30 and convert the results into an output voltage $V_{OUT}$ using the capacitance detection circuits 64 in order to detect the magnitude of the pressure being applied on the diaphragm 84.

The reference capacitor 30 makes up for changes in capacitance due to changes in temperature in the environment in which the sensor 10 is placed. As a result, the output voltage $V_{OUT}$ of the sensor 10 is independent of temperature and dependent only on pressure.

In the conventional capacitive pressure sensor 1, which was described above, the output voltage $V_{OUT}$ is proportional to the applied pressure, until the applied pressure reaches a value $P_A$, as shown in a graph in FIG. 19. Once the applied pressure reaches the value $P_A$, the diaphragm 84, shown in FIG. 16 through FIG. 18, comes into contact with the silicon substrate 80, starting at the center, where the diaphragm 84 deforms the most. Beyond this point, the output voltage $V_{OUT}$ gradually becomes saturated and is no longer proportional to the applied pressure. When the applied pressure reaches a value $P_B$, the center part of the diaphragm 84 comes into complete contact with the silicon substrate 80. As a result, the output voltage $V_{OUT}$ is completely saturated with respect to the applied pressure and can no longer represent the applied pressure.

When the diaphragm 84 is thicker, or the diameter of the diaphragm 84 is smaller, the shape of the diaphragm 84 would not change as much with respect to the applied pressure, and it would be possible detect a wider range of pressure levels. However, when the diaphragm 84 is thicker, or the diameter of the diaphragm 84 is smaller, sensor sensitivity suffers. That is, the resolution in detectable pressure is smaller.

An ideal pressure sensor is able to detect a wide range of physical loads (pressure, acceleration, vibration, sound pressure) and offer a high level of sensitivity to detect minute changes in the physical loads across their entire ranges. However, it is difficult to produce such a sensor. On the other hand, a normal application for a capacitive pressure sensor would require a measurement range over which the measurement results must be highly precise, as well as a range over which lower sensitivity is acceptable. In many cases, a lower detectible resolution would be acceptable when the magnitude of the physical load to be measured is large.

Therefore, it is the goal of this invention to provide a capacitive pressure sensor capable of both detecting small changes in pressure across a range over which a high sensitivity is required and of detecting a wide range of pressure levels across a range over which high sensitivity is not required.

SUMMARY OF THE INVENTION

This invention is essentially a capacitive physical load sensor including a substrate having a fixed electrode and a diaphragm having a movable electrode. The diaphragm is located across a gap from the substrate. A retaining part for the diaphragm is formed around the diaphragm a protruding part extends from a surface of the substrate or from a surface of the diaphragm into the gap.

The protruding part may be one of a plurality of protruding parts, and surfaces of the protruding parts support the diaphragm when certain physical loads are applied to the diaphragm, respectively.

In a further aspect, the invention may include a correction circuit for correcting a load detection value outputted by the diaphragm, so that the sensor correction circuit issues an output value that changes in a manner that is substantially proportional to changes in the physical load applied to the diaphragm.

DETAILED DESCRIPTION OF THE PREFERRED EMBODIMENTS

The structure of the capacitive pressure detection system of this embodiment will be explained by referring to FIG. 1 through FIG. 5.

Figure 1:
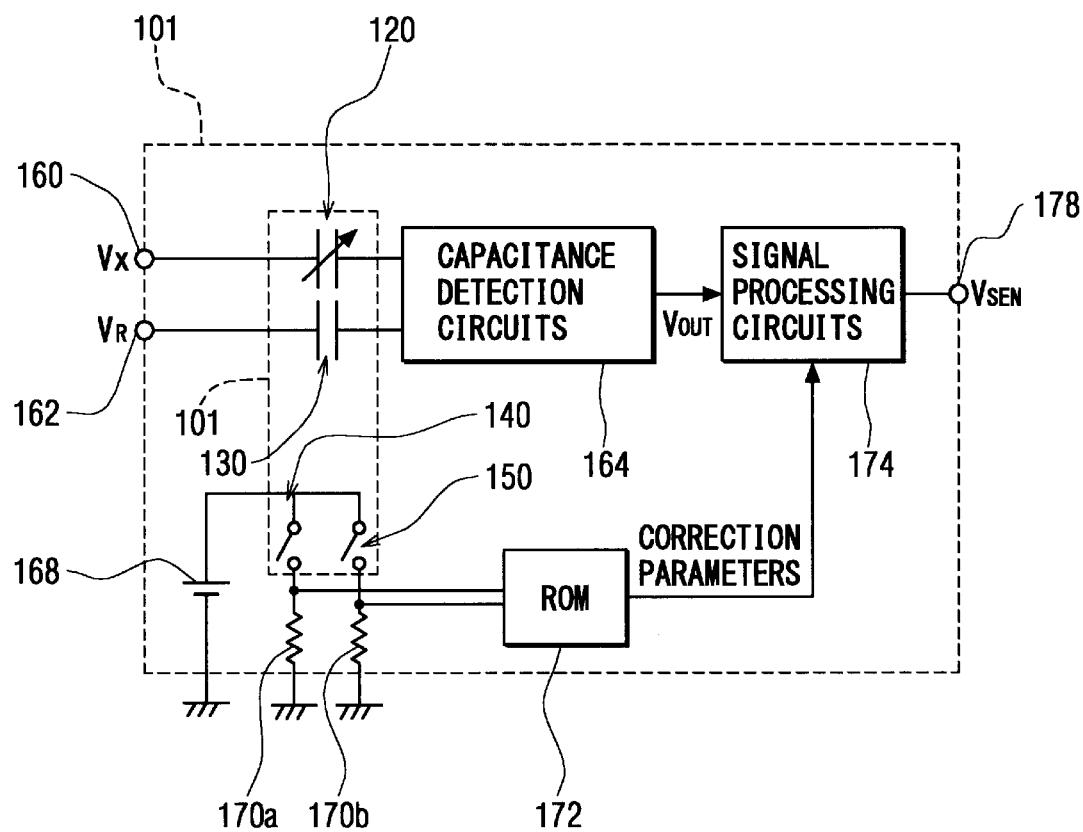
FIG. 1 is a block diagram of one embodiment of a capacitive pressure detecting system of the present invention.

As shown in FIG. 1, a capacitive sensor detection system 101 includes a capacitive pressure sensor 110, capacitive detection circuits 164, a ROM 172, and signal processing circuits 174. The capacitive pressure sensor 110 includes a pressure sensitive capacitor 120 with pressure sensitive capacitance $C_X$, reference capacitor 130 with reference capacitance $C_R$, a first switch 140, and a second switch 150. The pressure sensitive capacitor 120 is connected to an input lead 160 of the detection voltage $V_X$. The reference capacitor 130 is connected to an input lead 162 of a reference voltage $V_R$. The pressure sensitive capacitor 120 and reference capacitor 130 are connected to the capacitive detection circuits 164.

A first switch 140 is connected in series to a resistance 170a, and a second switch 150 is connected in series to a resistance 170b. A group including the first switch 140 and resistance 170a and a group including the second switch 150 and resistance 170b are connected in parallel with each other and to a power supply 168. Wiring lines extend from a point between the first switch 140 and resistance 170a and from a point between the second switch 150 and resistance 170b, respectively, to the ROM 172.

Capacitance detection circuits 164 and ROM 172 are connected to the signal processing circuits 174. Signal processing circuits 174 are connected to output lead 178 for a voltage $V_{SEN}$.

Capacitive pressure sensor 110 is actually manufactured by forming a diaphragm on a silicon substrate. More specifically, the capacitive pressure sensor 110, as shown in FIG. 3 to FIG. 5, includes a silicon substrate 180, a diaphragm 184 formed across a gap 182 from the silicon substrate 180, and a retaining part 186 for the diaphragm 184 formed around the diaphragm 184.

A pressure sensitive capacitor lower electrode 122b, reference capacitance lower electrode 132b, first lower switch 142b, and second lower switch 152b are formed on the silicon substrate 180, with a highly concentrated impurity diffusion layer on the silicon substrate 180 for ensuring high conductance. A pressure sensitive capacitance lower electrode 122b is connected to a pressure sensitive capacitance lower electrode pad 126b through a pressure sensitive capacitance lower electrode lead 124b (see FIG. 2 and FIG. 3), and the reference capacitance lower electrode 132b is connected to a reference capacitor lower electrode pad 136b through a reference capacitance lower electrode lead 134b (see FIG. 2 and FIG. 3). The first lower switch 142b is connected to the first lower switch pad 146b through a first lower switch lead 144b (see FIG. 2), while the second lower switch 152b is connected to a second lower switch pad 156b through a second lower switch lead 154b (see FIG. 2). The surface of the silicon substrate 180 is protected with a substrate protective film 188 (see FIG. 3 through FIG. 5).

The diaphragm 184 includes a semiconductor film 192, made of a polysilicon film, and a sealing film 196, made of a silicon nitride film. A pressure sensitive capacitance upper electrode 122a, reference capacitance upper electrode 132a, first upper switch 142a (an example of a protruding part), and second upper switch 152a (an example of an protruding part) are formed on the semiconductor film 192 with a highly concentrated impurity diffusion layer in the semiconductor film 192 for ensuring high conductance. Pressure sensitive capacitance upper electrode 122a is connected to a pressure sensitive capacitance upper electrode pad 126a through a pressure sensitive capacitance upper electrode lead 124a (see FIG. 2 and FIG. 4), while the reference capacitance upper electrode 132a is connected to a reference capacitance upper electrode pad 136a through a reference capacitance upper electrode lead 134a (see FIG. 2 and FIG. 4). In addition, the first upper switch 142a is connected to a first upper switch pad 146a through a first upper switch lead 144a (see FIG. 2), while the second upper switch 152a is connected to a second upper switch pad 156a through a second upper switch lead 154a (see FIG. 2).

Figure 2:
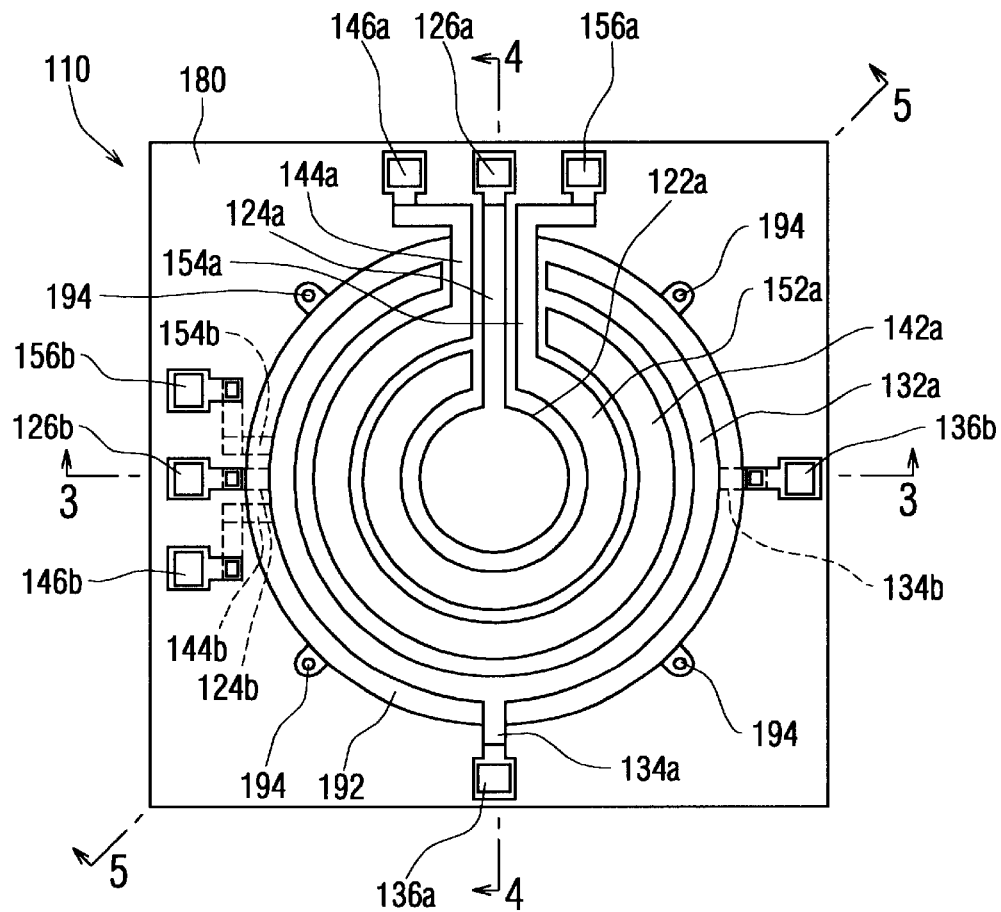
FIG. 2 is a plan view of the capacitive pressure sensor of FIG. 1.
Figure 3:
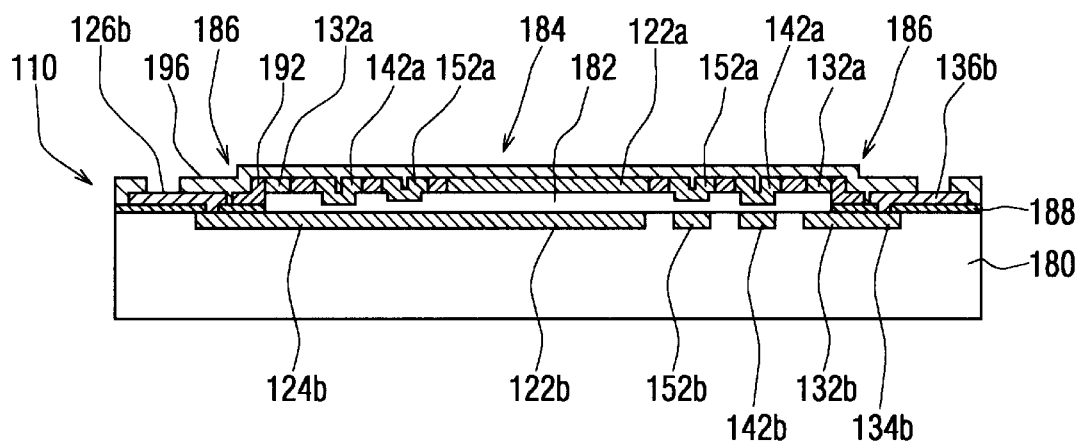
FIG. 3 is a cross-sectional view along line 3—3 in FIG. 2.
Figure 4:
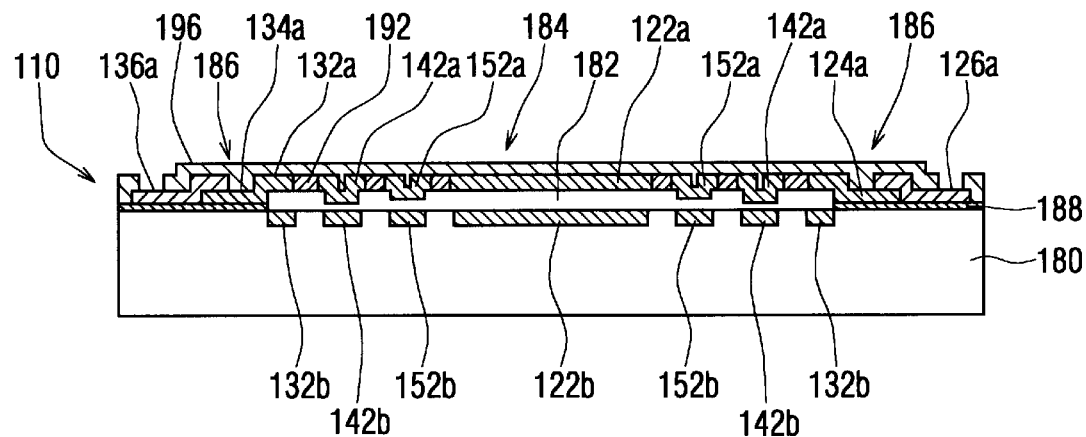
FIG. 4 is a cross-sectional view along a 4—4 in FIG. 2.
Figure 5:
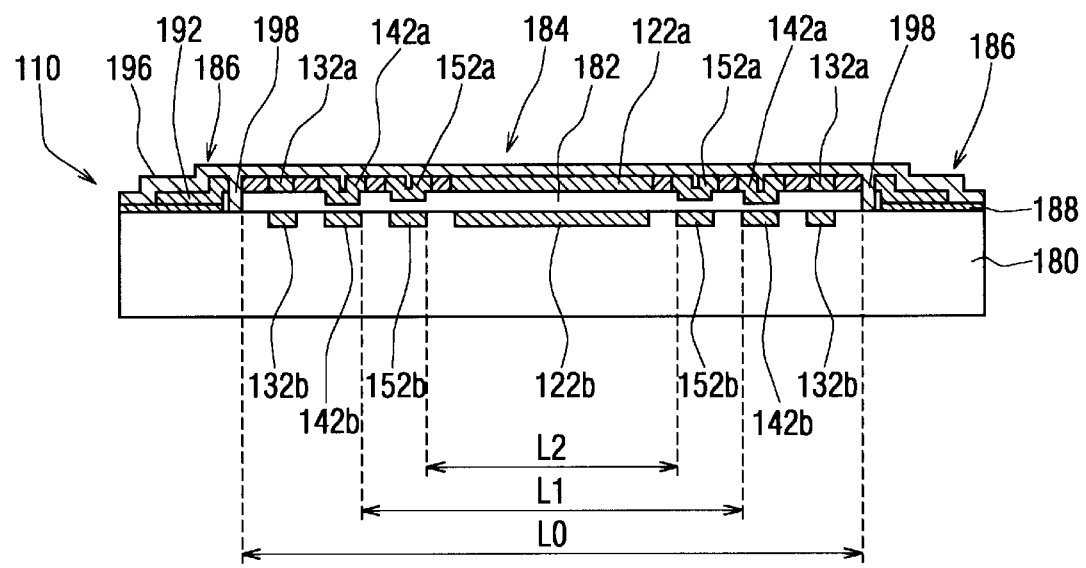
FIG. 5 is a cross-sectional view along line 5—5 in FIG. 2.

As shown in the top view in FIG. 2, the pressure sensitive capacitor upper electrode 122a is formed into a circular plate, and the pressure sensitive capacitor lower electrode 122b, also formed into a similar circular plate, faces the pressure sensitive capacitor upper electrode 122a (shown in FIG. 3 through FIG. 5).

The second upper switch 152a is formed to surround the outer perimeter of the pressure sensitive capacitor upper electrode 122a. The second upper switch 152a is formed into a ring along a topographical line along which the semiconductor film 192 changes shape. The second upper switch 152a, as shown in FIG. 3 through FIG. 5, protrudes from the lower surface of the semiconductor film 192 into the gap 182. The ring-shaped second lower switch 152b of the same size as the second upper switch 152a faces the second upper switch 152a.

The first upper switch 142a is formed in such a way as to surround the outer perimeter of the second upper switch 152a. The first upper switch 142a is formed into a ring shape along a topographical line along which the semiconductor film 192 changes shape. The first upper switch 142a, as shown in FIG. 3 through FIG. 5, protrudes from the lower surface of the semiconductor film 192 into the gap 182. The first upper switch 142a extends further than the second upper switch 152a. The lengths over which the first upper switch 142a and the second upper switch 152a extend are adjusted so that the first upper switch 142a will first touch the first lower switch 142b, and then the second upper switch 152a will touch the second lower switch 152b, when a pressure is applied on the diaphragm 184.

The pressure sensitive capacitor 120, shown in FIG. 1, includes the pressure sensitive capacitor upper electrode 122a and pressure sensitive capacitor lower electrode 122b, as shown in FIG. 3 through FIG. 5. The reference capacitor 130 in FIG. 1 includes the reference capacitor upper electrode 132a and reference capacitor lower electrode 132b, as shown in FIG. 3 through FIG. 5. The first switch 140 shown in FIG. 1 includes the first upper switch 142a and the first lower switch 142b, as shown in FIG. 3 through FIG. 5. The second switch 150 shown in FIG. 1 includes the second upper switch 152a and the second lower switch 152b, as shown in FIG. 3 through FIG. 5.

The capacitance detection circuits 164 in FIG. 1 may be formed with switched capacitor circuits. Switched capacitor circuits can be easily formed with a normal semiconductor process and integrated into the same substrate as the capacitive pressure sensor 110. The signal processing circuits 174, shown in FIG. 1, may be formed with multiplier circuits that basically multiply the output voltage $V_{OUT}$ from the capacitance detection circuits 164 with the correction parameters from the ROM 172. The ROM 172, shown in FIG. 1, may be implemented with battery backed RAM, flash memory, or non-volatile RAM. The signal processing circuits 174 and ROM 172 can also be integrated on the same substrate as the capacitive pressure sensor 110.

Next, an example of a method of manufacturing the capacitive pressure sensor 110 in the capacitive pressure detection system 101 of this embodiment will be discussed by referring to FIG. 6 through FIG. 11. The diaphragm structure and the electrode pair structure, mentioned above, are implemented using a manufacturing method that is described below.

Figure 6:
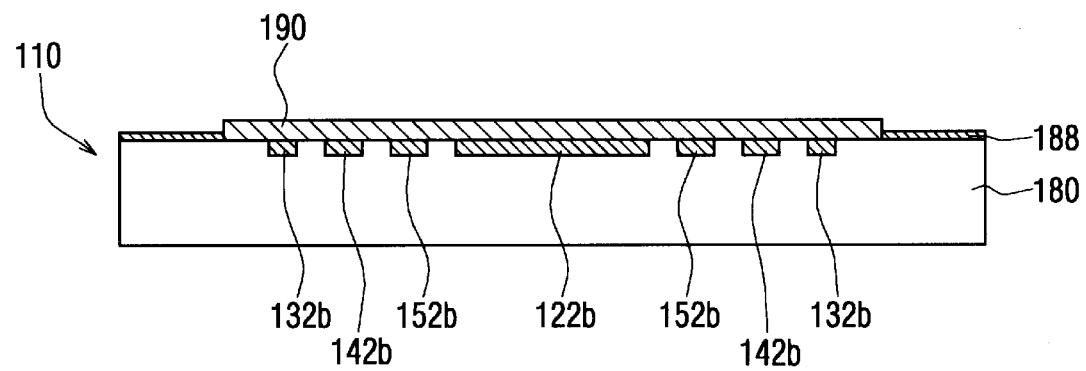
FIG. 6 is a diagram showing a first part of a manufacturing process of the sensor of FIG. 2.
Figure 7:
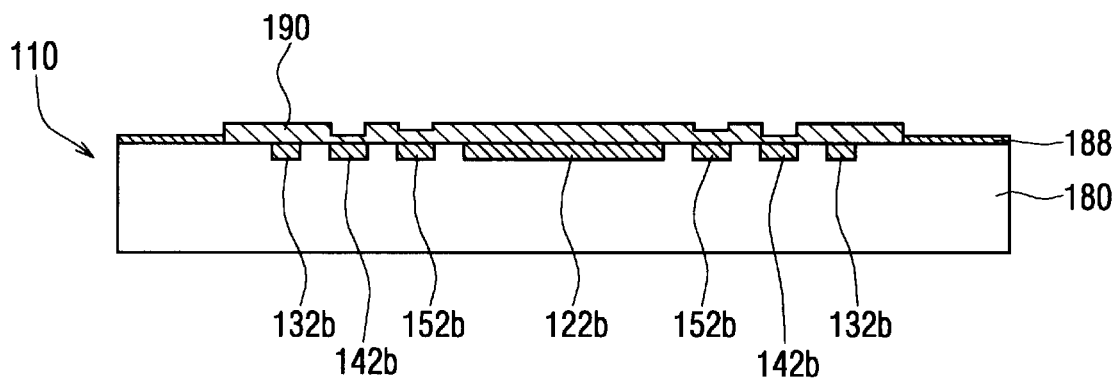
FIG. 7 is a diagram showing a second part of a manufacturing process of the sensor of FIG. 2.

As shown in FIG. 6, a diffusion layer (pressure sensitive capacitor lower electrode 122b, reference capacitor lower electrode 122b, first lower switch 142b and second lower switch 152b) is formed by adding impurities locally to the surface of the silicon substrate 180 by thermal diffusion or ion implanting. Then, a substrate protective layer 188, which resists etching, is formed by depositing a silicon nitride film by, for example, a CVD method. A sacrificial layer 190 is formed by depositing a silicon oxide film by, for example, a CVD method. As shown in FIG. 7, dry etching is performed using a resist (not shown in the figure) as a mask to pattern the sacrificial layer 190. This patterning step is performed in order to form parts that will later turn into the first upper switch 142a and the second upper switch 142b. A part for the first upper switch 142a has a different depth from a part for the second upper switch 142b in these patterns. More specifically, the part where the first upper switch 142a is to be formed is initially etched to a prescribed depth. Next the part where the first upper switch 142a is to be formed and the part where the second upper switch 142b is to be formed are both etched simultaneously. As a result, the part where the first upper switch 142a is to be formed is etched more deeply than the part where the second upper switch 142b is to be formed.

Figure 8:
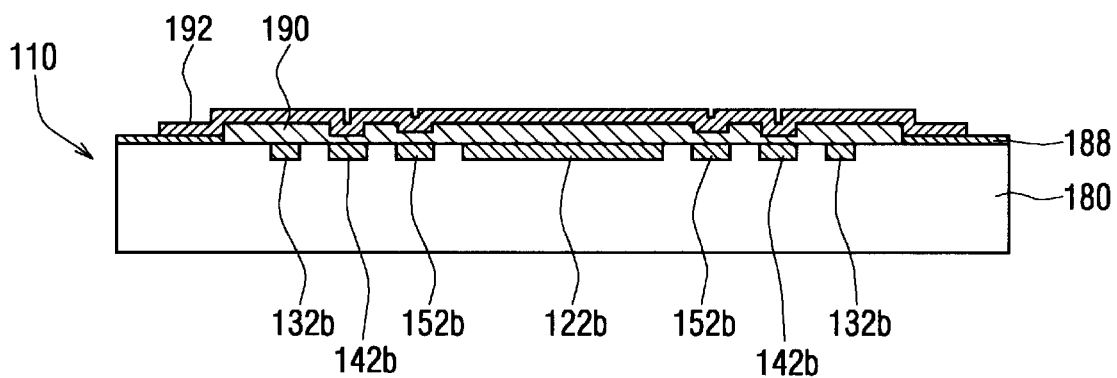
FIG. 8 is a diagram showing a third part of a manufacturing process of the sensor of FIG. 2.
Figure 9:
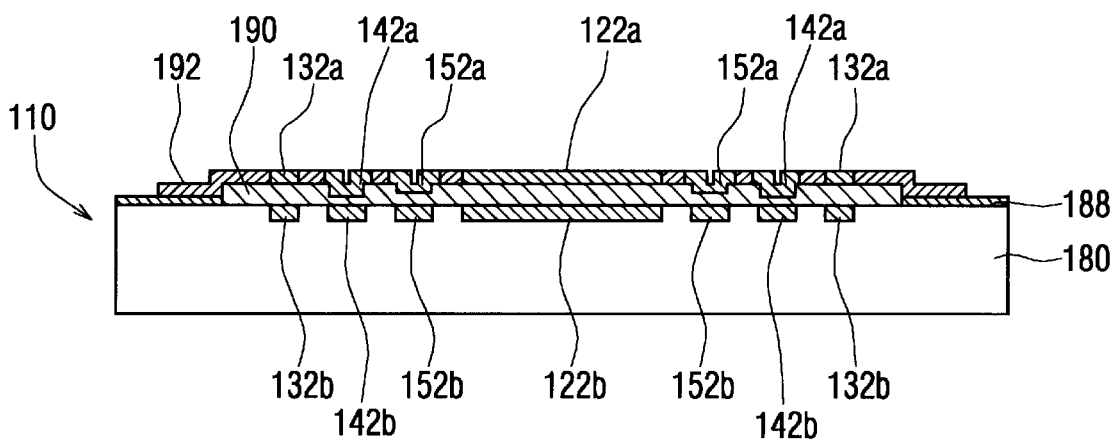
FIG. 9 is a diagram showing a fourth part of a manufacturing process for the sensor of FIG. 2.
Figure 10:
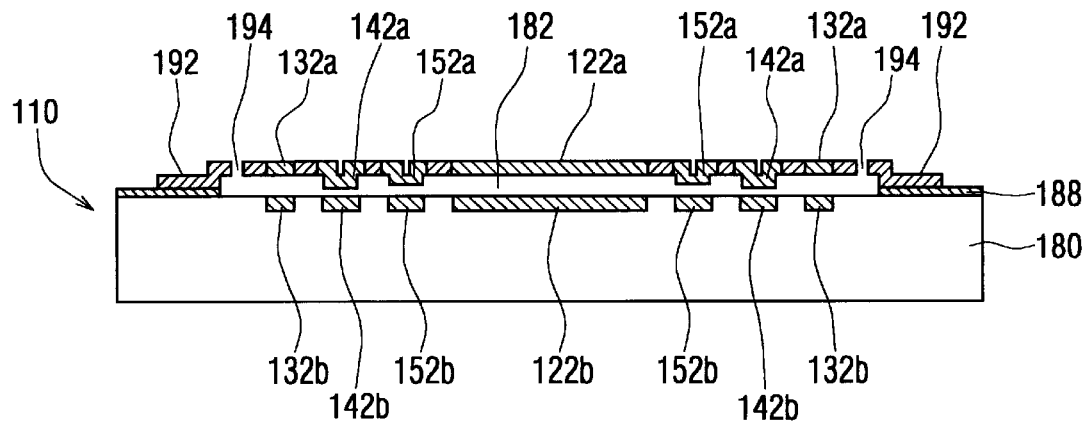
FIG. 10 is diagram showing a fifth part of a manufacturing process of the sensor of FIG. 2.
Figure 11:
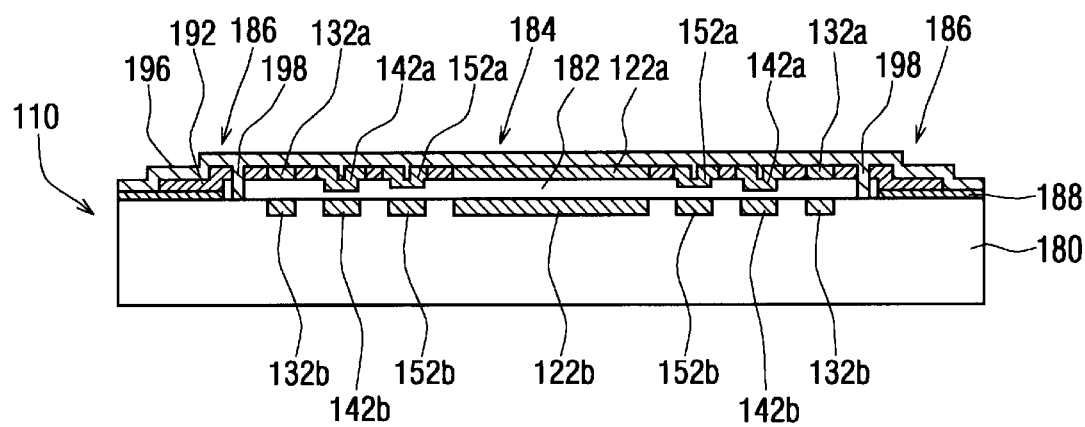
FIG. 11 is a diagram showing a sixth part of a manufacturing process of the sensor of FIG. 2.

As shown in FIG. 8, the semiconductor film 192, which is etch-resistant, is next formed by depositing a polysilicon film by, for example, a CVD method. As shown in FIG. 9, a diffusion layer (pressure sensitive capacitor upper electrode 122a, reference capacitor upper electrode 132a, first upper switch 142a and second upper switch 152a) is formed by adding a small dose of p-type impurity, such as phosphorous, locally into the surface of the semiconductor film 192 by thermal diffusion or ion implanting. Because leakage currents may flow from the diffusion layer into the semiconductor film 192, depending on the temperature, a small dose of n-type impurities should be added to the semiconductor film 192 to prevent leakage. As shown in FIG. 10, etching holes 194 are next formed in the semiconductor film 192, and the sacrificial layer 190 is stripped by wet etching. An etching solution used for etching should preferably be able to etch well the silicon oxide film that makes up the sacrificial layer 190 but not the silicon nitride film that makes up the substrate protective layer 188 or the poly silicon film that makes up the semiconductor layer 192 (for example, HF acid solution). Besides the wet etching method mentioned so far, etching may also be accomplished by dry etching using a gas mixture with HF and water vapor or methyl alcohol. As shown in FIG. 11, the sealing film 196 is then formed to seal the etching holes 194. As a result, the gap 182 turns into a vacuum and functions as a reference pressure chamber. Finally, the diaphragm 184 and the retaining part 186 for the diaphragm 184 are formed.

In the embodiment discussed above, the sacrificial layer 190 is formed by depositing a silicon oxide film with a CVD method. The sacrificial layer 190 may also be formed by depositing a silicon oxide film by thermal oxidation. Any material would work, as long as the material forms a stable deposit film on the silicon substrate 180 and would etch much more rapidly than the poly silicon film that makes up the semiconductor film 192.

The following is a description of the operation of the capacitive pressure detection system 101 of this embodiment. When a prescribed level of pressure is applied on the diaphragm 184, as shown in FIGS. 3 to 5, the gap 182 acts as a reference pressure chamber, which is a sealed vacuum. The diaphragm 184 changes its shape in proportion to the pressure being applied. As the diaphragm 184 deforms, distance between the pressure sensitive capacitor upper electrode 122a and pressure sensitive capacitor lower electrode 122b changes. Capacitance between the two electrodes changes as the distance between the two electrodes changes. As shown in FIG. 1, capacitance detection circuits 164 sense the changes in the pressure sensitive capacitance $C_X$ of the pressure sensitive capacitor 120 with respect to the reference capacitance $C_R$ of the reference capacitor 130 and converts results into the output voltage $V_{OUT}$. A solid line in FIG. 12 shows a relationship between the applied pressures and voltage value $V_{OUT}$.

Figure 12:
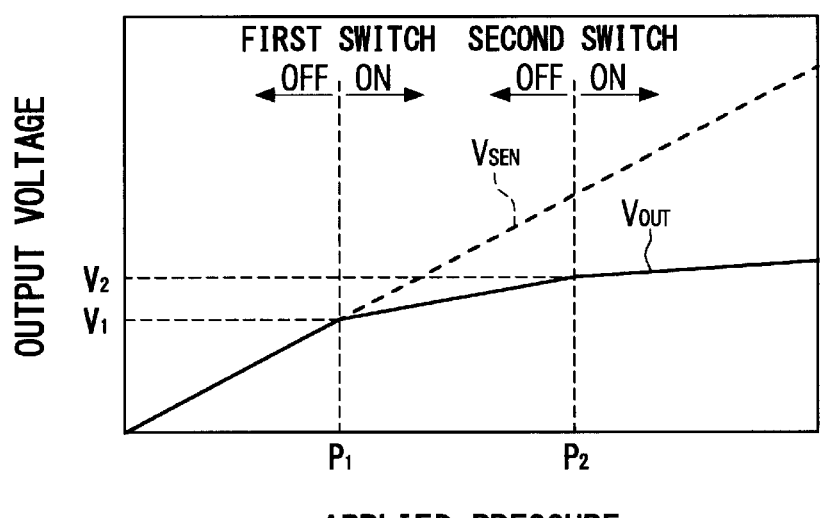
FIG. 12 is a graph showing the applied pressure-output voltage characteristics of the capacitive pressure detection system of the sensor of FIG. 2.

As shown in FIG. 12, once the applied pressure reaches a level $P_1$, the first upper switch 142a comes into contact with the first lower switch 142b due to the diaphragm 184 changing shape, and the first switch 140 closes. From this point on, the first upper switch 142a and the first lower switch 142b, which are in contact, determine the area of the diaphragm that changes shape under the applied pressure. In other words, the area inside the first upper switch 142a and the first lower switch 142b would be the area where the diaphragm 184 changes shape in proportion to pressure. Because the diameter of this area is smaller, the diaphragm 184 tends to change shape less, and the voltage value $V_{OUT}$ tends to increase by a smaller increment in proportion to the increase in the pressure being applied. Once the applied pressure reaches a level $P_2$, the second upper switch 152a comes into contact with the second lower switch 152b, and the second switch 150 closes. From this point on, the second upper switch 152a and the second lower switch 152b, which are in contact with each other, determine the area in which the diaphragm changes shape under pressure. In other words, only the area inside the second upper switch 152a and the second lower switch 152b is the area where the diaphragm 184 changes shape in proportion to the pressure. Because the diameter of the area in which the diaphragm 184 changes shape is even smaller, the diaphragm 184 is even less likely to change shape. The increments by which the output voltage $V_{OUT}$ increases become even smaller with respect to the increase in applied pressure.

When each of the switches 140, 150 is closed, the conditions under which the diaphragm 184 is supported changes. When the first switch 140 closes, the pressure detecting area of the diaphragm 184 decreases in size from a circular area with a diameter L0 supported by the retaining part 186 (shown in FIG. 5) to a circular area with a smaller diameter L1 supported by the first upper switch 142a. Furthermore, when the second switch 150 closes, the pressure detecting area of the diaphragm 184 decreases in size from a circular area of the diameter L1 supported by the first upper switch 142a to a circular area of a diameter L2 supported by the second upper switch 152a. When the size of the pressure detecting area of the diaphragm 184 decreases, the amount by which the diaphragm 184 changes shape (amount of stretching) with respect to changes in the magnitude of the applied pressure decreases. As a result, the distance between the pressure sensitive capacitor electrodes 122a and 122b changes by smaller increments, and consequently the pressure sensitive capacitance between the pressure sensitive capacitor electrodes 122a and 122b changes by smaller increments (or changes in voltage value $V_{OUT}$.)

As shown in FIG. 1, a voltage is applied by the power supply 168 on resistance 170a, when the first switch 140 closes in the sensor. The ROM 172 provides a correction parameter signal output as a result of this voltage being transmitted to the ROM 172. The correction parameter signals are sent to the signal processing circuits 174. The signal processing circuits 174 also receive the output voltage $V_{OUT}$ from the capacitance detection circuit 164 and output the value $V_{SEN}$, which is a product of the voltage $V_{OUT}$ and correction parameters from the correction parameter signals.

The steps described above provide a correction for ensuring that the rate at which the voltage $V_{OUT}$ changes with respect to changes in the applied pressure before the first switch 140 closes are almost the same as the rate at which the voltage $V_{SEN}$ changes with respect to changes in applied pressure after the first switch 140 closes. Similarly, these steps provide a correction to ensure that the rate at which the voltage $V_{OUT}$ changes with respect to changes in the applied pressure before the second switch 150 closes is almost the same as the rate at which the voltage $V_{SEN}$ changes with respect to the applied pressure after the second switch 150 closes. The relationship between the applied pressure and output voltage $V_{OUT}$ before the correction is represented by the solid line in FIG. 12, while the relationship between applied pressure and output voltage $V_{SEN}$ and after the correction is represented by the broken line, which has is almost linear.

In the embodiment described above, the correction parameters are applied to the voltage $V_{OUT}$ while the first switch 140 or the second switch 150 is turned on. However, correction parameter values that are less than one might also be applied to the voltage $V_{OUT}$ before the first switch 140 or the second switch 150 closes. It is also possible to apply two different sets of correction parameter values on the voltage $V_{OUT}$ before and after the first switch 140 or the second switch 150 closes.

Furthermore, although the correction parameters are applied to the voltage $V_{OUT}$ while the first switch 140 or the second switch 150 is turned on in the embodiment described above, the correction parameters may also be applied to the voltage $V_{OUT}$ when the voltage $V_{OUT}$, which is an output from the capacitance detection circuits 164, shows values above prescribed voltage levels of $V_1$ or $V_2$. It is also possible to apply correction parameter values that are less than one on the voltage $V_{OUT}$ before the voltage $V_{OUT}$ reaches $V_1$ or $V_2$. Furthermore, it is also possible to apply different sets of correction parameter values on the voltage $V_{OUT}$ before and after the voltage $V_{OUT}$ reaches the voltage level $V_1$ or $V_2$.

Although correction parameters are applied on the voltage $V_{OUT}$ by multiplication in the embodiment described above, it is also possible to make corrections to ensure that the rate at which the voltage $V_{OUT}$ changes with respect to the applied pressure before the switch closes would almost be the same as the rate at which the voltage $V_{SEN}$ changes with respect to the applied pressure after the switch is turned on by applying the correction parameters on the voltage $V_{OUT}$ by division, addition, or subtraction.

So far, one embodiment of the capacitive pressure sensor of this invention has been discussed. However, applications of this invention are not limited to the embodiment described. In other words, improvements and modifications to the embodiment of this invention are possible by those knowledgeable in the art.

Figure 13:
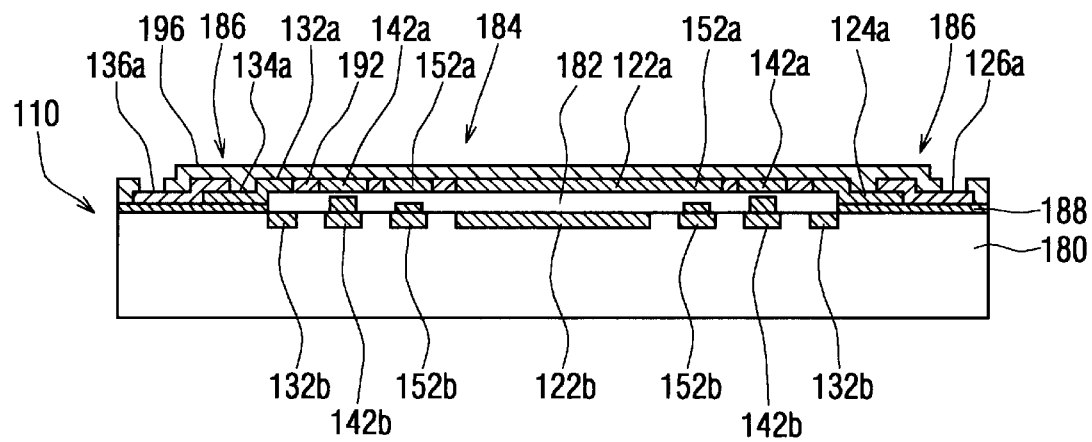
FIG. 13 is a diagram like to FIG. 4 for a capacitive pressure sensor of another embodiment.
Figure 14:
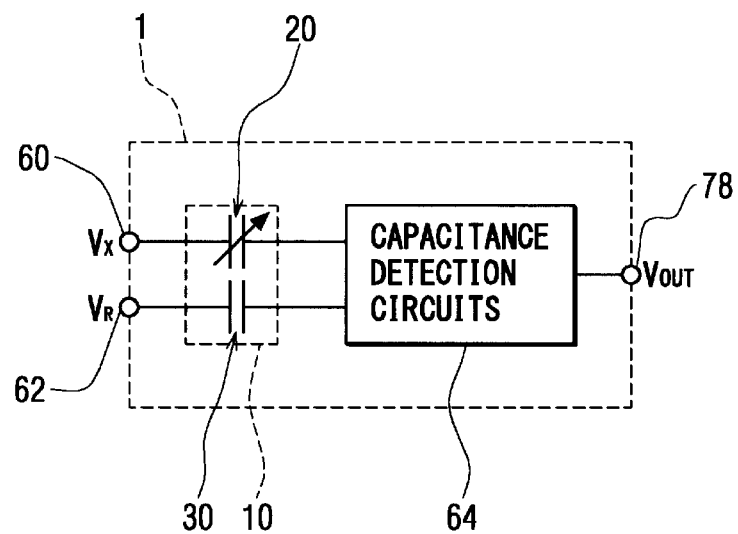
FIG. 14 is a block diagram for a conventional capacitive pressure detection system.
Figure 15:
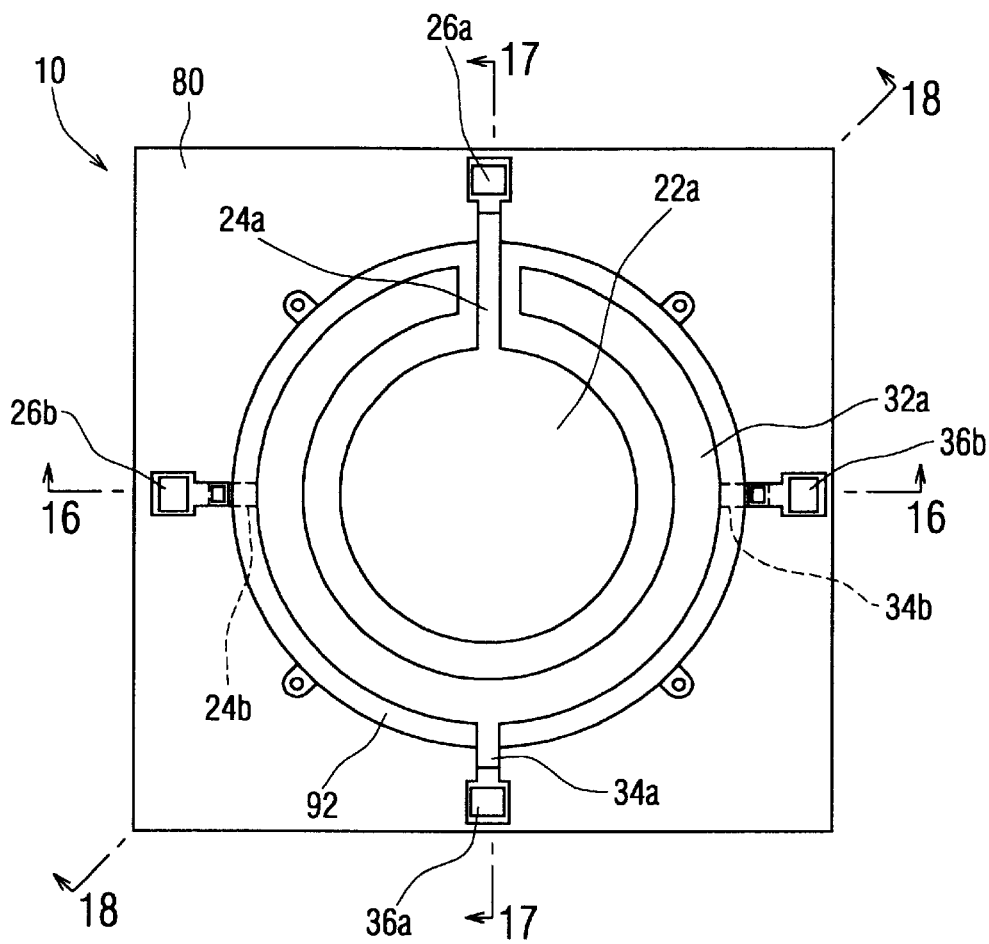
FIG. 15 is a top view of a conventional capacitive pressure sensor.
Figure 16:
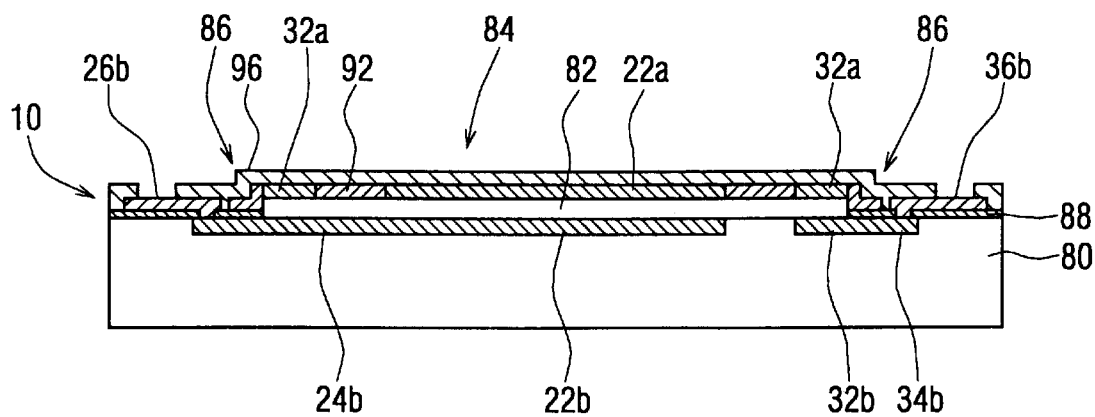
FIG. 16 is a cross-sectional view along a line 16—16 in FIG. 15.
Figure 17:
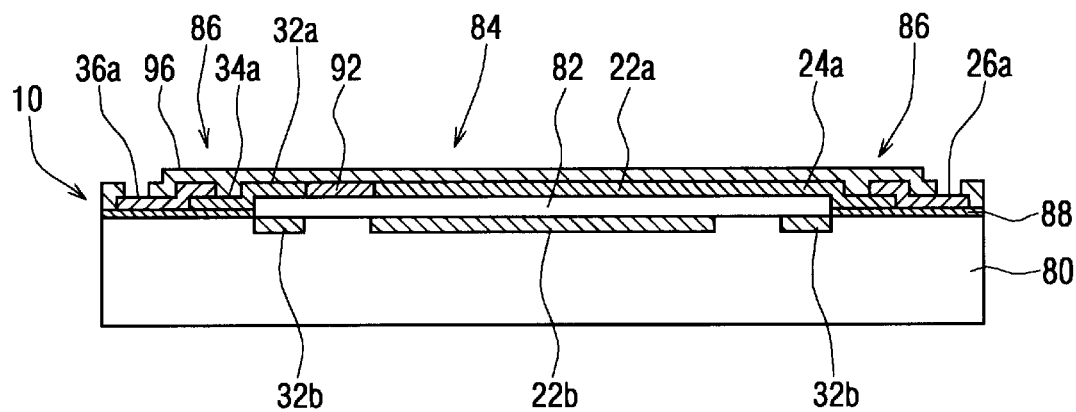
FIG. 17 a cross-sectional view along a 17—17 line in FIG. 15.
Figure 18:
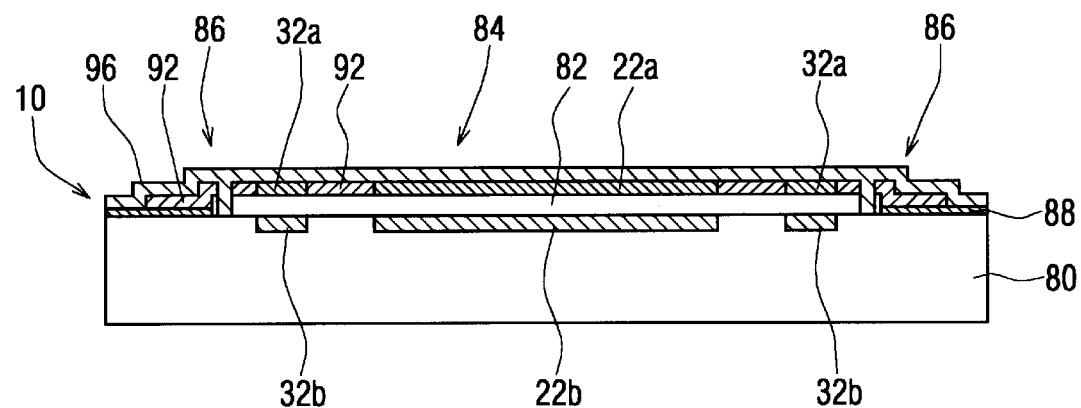
FIG. 18 is a cross-sectional view along an 18—18 in FIG. 15.
Figure 19:
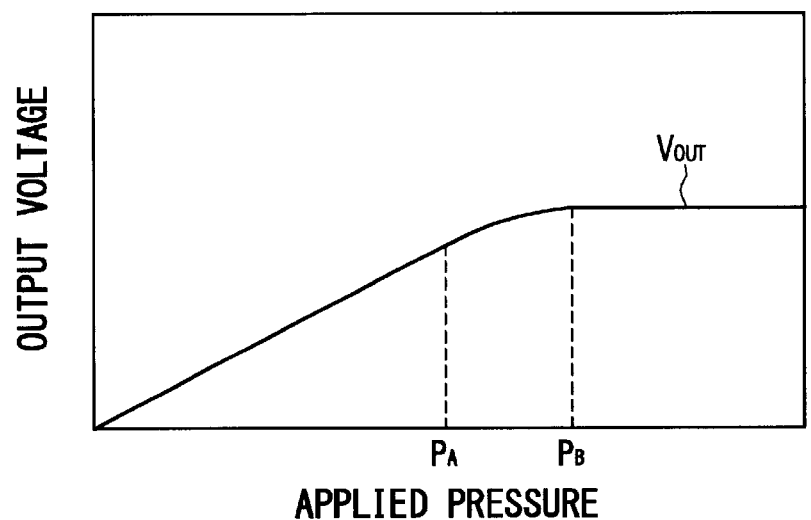
FIG. 19 is a graph showing the applied pressure-output voltage characteristics of the conventional capacitive pressure detection system of FIGS. 14–18.

Although in this embodiment, as shown in FIG. 3 through FIG. 5, it is the first upper switch 142a and the second upper switch 152a that protrude into the gap 182 from the surface of the semiconductor film 192 that faces the gap 182, the applications of this invention are not so limited. For example, as shown in FIG. 13, it is also possible to have the first lower switch 142b and the second lower switch 152b protrude from the surface of the silicon substrate 180 into the gap 182. These protruding parts might be formed by depositing a polysilicon film on the silicon substrate 180 by a CVD method, stripping unnecessary parts by etching, and adding impurities to the polysilicon film by thermal diffusion or ion implanting. It is also possible to have both the upper and lower switches protrude into the gap.

In this particular embodiment, capacitance changes as a result of the diaphragm 184 stretching under pressure. This invention, however, will also apply to capacitance changing as a result of the diaphragm 184 stretching under other types of physical loads, including acceleration, vibration, and sound pressure.

Furthermore, in this particular embodiment, two concentric rings of protruding parts 142a and 152a facilitate two stages of sensitivity levels. However, additional sensitivity levels are also possible with this invention. Furthermore, instead of the ring-shaped protruding parts 142a and 152a, a multitude of column-shaped protruding parts may also be laid out in rings, if the diaphragm 184 is circular in shape when flat. If the diaphragm 184 is, for example, square-shaped when flat, a single protruding part or a multitude of protruding parts should preferably be laid out along the topographical line(s) along which the diaphragm 184 changes shape (lines along which the magnitude of stretching would be the same).

What is claimed is:

1. A capacitive physical load sensor comprising a substrate having a fixed electrode;

a diaphragm having a movable electrode, wherein the diaphragm is located across a gap from the substrate;

a retaining part for the diaphragm formed around the diaphragm;

a plurality of protruding parts, wherein each protruding part extends from a surface of the substrate or from a surface of the diaphragm into the gap, and surfaces of the protruding parts contact an opposed surface, the opposed surface being the surface of either the substrate or the diaphragm, to support the diaphragm when certain physical loads are applied to the diaphragm, respectively; and a correction circuit for correcting a load detection value outputted by the diaphragm, so that the sensor correction circuit issues an output value that changes in a manner that is substantially proportional to changes in the physical load applied to the diaphragm, wherein the load detection value is corrected according to whether the protruding parts are supporting the diaphragm, so that the rate of change of the sensor output value remains substantially constant with respect to the changes in the load applied to the diaphragm before and after the protruding parts support the diaphragm.

2. A capacitive physical load sensor comprising a substrate having a fixed electrode;

a diaphragm having a movable electrode, wherein the diaphragm is located across a gap from the substrate;

a retaining part for the diaphragm formed around the diaphragm;

a plurality of protruding parts, wherein each protruding part extends from a surface of the substrate or from a surface of the diaphragm into the gap, and surfaces of the protruding parts contact an opposed surface, the opposed surface being the surface of either the substrate or the diaphragm, to support the diaphragm when certain physical loads are applied to the diaphragm, respectively; and a correction circuit for correcting a load detection value outputted by the diaphragm, so that the sensor correction circuit issues an output value that changes in a manner that is substantially proportional to changes in the physical load applied to the diaphragm, wherein the physical load detection parameter values are corrected according to whether the load detection value has achieved a prescribed value, so that the rate of change of the sensor output value remains substantially constant with respect to changes in load in the diaphragm before and after the load detection value achieves the prescribed value.

3. A capacitive physical load sensor comprising a substrate having a fixed electrode;

a diaphragm having a movable electrode, wherein the diaphragm is located across a gap from the substrate;

a retaining part for the diaphragm formed around the diaphragm;

a plurality of protruding parts, wherein each protruding part extends from a surface of the substrate or from a surface of the diaphragm into the gap, and surfaces of the protruding parts contact an opposed surface, the opposed surface being the surface of either the substrate or the diaphragm, to support the diaphragm when certain physical loads are applied to the diaphragm, respectively; and a correction circuit for correcting a load detection value outputted by the diaphragm, so that the sensor issues an output value that changes in a manner that is proportional to changes in the physical load applied to the diaphragm, wherein the physical load detection parameter values are corrected according to whether the load detection value has achieved a prescribed value, so that the rate of change of the sensor output value remains substantially constant with respect to changes in the load in the diaphragm before and after the load detection value achieves the prescribed value.

4. A capacitive physical load sensor comprising a substrate having a fixed electrode;

a diaphragm having a movable electrode, wherein the diaphragm is located across a gap from the substrate;

a retaining part for the diaphragm formed around the diaphragm;

a plurality of protruding parts, wherein each protruding part extends from a surface of the substrate or from a surface of the diaphragm into the gap, and surfaces of the protruding parts contact an opposed surface, the opposed surface being the surface of either the substrate or the diaphragm, to support the diaphragm when certain physical loads are applied to the diaphragm, respectively; and a correction circuit for correcting a load detection value outputted by the diaphragm, so that the sensor issues an output value that changes in a manner that is proportional to changes in the physical load applied to the diaphragm, wherein the load detection value is corrected according to whether each protruding part is supporting the diaphragm, so that the rate of change of the sensor output value remains substantially constant with respect to the changes in the load applied to the diaphragm before and after each protruding part supports the diaphragm.

5. A capacitive physical load sensor comprising a substrate having a fixed electrode;

a diaphragm having a movable electrode, wherein the diaphragm is located across a gap from the substrate, and the fixed electrode and the movable electrode detect deformation of the diaphragm;

a retaining part for the diaphragm formed around the diaphragm; and a plurality of protruding parts, wherein each protruding part extends from a surface of the substrate or from a surface of the diaphragm into the gap, and surfaces of the protruding parts contact an opposed surface, the opposed surface being the surface of either the substrate or the diaphragm, to support the diaphragm when certain physical loads are applied to the diaphragm, respectively, wherein each protruding part is located at a respective position radially spaced from the center of the diaphragm, and the protruding parts restrict deformation of the diaphragm and form switches that signal that the corresponding protruding part is supporting the diaphragm.

6. The sensor of claim 5 further comprising a correction circuit for correcting an output signal from the diaphragm according to the state of the switches.

7. A capacitive physical load sensor comprising a substrate having a fixed electrode;

a diaphragm having a movable electrode, wherein the diaphragm is located across a gap from the substrate, and the fixed electrode and the movable electrode detect deformation of the diaphragm;

a retaining part for the diaphragm formed around the diaphragm;

a plurality of protruding parts, wherein:

each protruding part extends from a surface of the substrate or from a surface of the diaphragm into the gap, and surfaces of the protruding parts contact an opposed surface, the opposed surface being the surface of either the substrate or the diaphragm, to support the diaphragm when certain physical loads are applied to the diaphragm, respectively;

each protruding part is located at a respective position radially spaced from the center of the diaphragm;

the plurality of protruding parts includes an outer protruding part and an inner protruding part, wherein the outer protruding part is radially outside of the inner protruding part, and the protruding parts have different heights such that the outer protruding part protrudes by a greater distance than the inner protruding part;

the protruding parts restrict deformation of the diaphragm, and less deformation of the diaphragm is required to cause the outer protruding part to restrict deformation of the diaphragm than is required for the inner protruding part to restrict deformation of the diaphragm; and wherein the protruding parts serve as switches, respectively, and the sensor includes a correction circuit that corrects a signal output from the diaphragm according to the states of the switches.

* * * * *